US008917774B2

(12) United States Patent
Antonellis et al.

(10) Patent No.: US 8,917,774 B2
(45) Date of Patent: Dec. 23, 2014

(54) METHOD AND APPARATUS FOR GENERATING ENCODED CONTENT USING DYNAMICALLY OPTIMIZED CONVERSION

(75) Inventors: Darcy Antonellis, Granada Hills, CA (US); Massimiliano Gasparri, Los Angeles, CA (US)

(73) Assignee: Warner Bros. Entertainment Inc., Burbank, CA (US)

( * ) Notice: Subject to any disclaimer, the term of this patent is extended or adjusted under 35 U.S.C. 154(b) by 435 days.

(21) Appl. No.: 13/173,671

(22) Filed: Jun. 30, 2011

(65) Prior Publication Data

US 2012/0002716 A1    Jan. 5, 2012

Related U.S. Application Data

(60) Provisional application No. 61/360,088, filed on Jun. 30, 2010.

(51) Int. Cl.
| | |
|---|---|
| H04N 7/26 | (2006.01) |
| H04N 19/12 | (2014.01) |
| H04N 19/194 | (2014.01) |
| H04N 19/159 | (2014.01) |
| H04N 19/196 | (2014.01) |
| H04N 19/139 | (2014.01) |
| H04N 19/14 | (2014.01) |
| H04N 19/177 | (2014.01) |
| H04N 19/152 | (2014.01) |

(52) U.S. Cl.
CPC ... *H04N 19/00369* (2013.01); *H04N 19/00078* (2013.01); *H04N 19/00363* (2013.01); *H04N 19/00218* (2013.01); *H04N 19/00151* (2013.01); *H04N 19/00157* (2013.01); *H04N 19/00284* (2013.01); *H04N 19/00193* (2013.01)
USPC .................................................. 375/240.18

(58) Field of Classification Search
CPC .......... H04N 19/193; H04N 19/00157; H04N 19/00218; H04N 19/00284; H04N 19/00369; H04N 19/00151; H04N 19/00363; H04N 19/00078; H04N 19/00193
USPC ........... 375/240.18, 240.29, 240.01; 370/521, 370/240.01
See application file for complete search history.

(56) References Cited

U.S. PATENT DOCUMENTS 5,530,478 A * 6/1996 Sasaki et al. ............. 375/240.04
5,684,714 A * 11/1997 Yogeshwar et al. .......... 370/521

(Continued)

FOREIGN PATENT DOCUMENTS

WO    2008/038205 A2    3/2008

OTHER PUBLICATIONS

Office Action issued in a continuation application U.S. Appl. No. 13/205,720 on Jan. 2, 2013.

(Continued)

*Primary Examiner* — Richard Torrente
*Assistant Examiner* — Joseph Suh
(74) *Attorney, Agent, or Firm* — Gottlieb, Rackman & Reisman, P.C.

(57) ABSTRACT

An initial content is encoded a first time to obtain a first encoded content. One or more parameters obtained from the first encoding are used to generate an encoding coefficient. The initial content is encoded a second time to obtain a second encoded content. The second encoding is performed using encoding coefficients, at least one of which is derived from the parameter associated with the first encoding. The two encodings can be implemented using a single encoder or two separate encoders.

11 Claims, 1 Drawing Sheet

(56) References Cited

U.S. PATENT DOCUMENTS

| | | | |
|---|---|---|---|
| 8,290,338 B2 | 10/2012 | Sasaki et al. | |
| 8,306,387 B2 | 11/2012 | Yamashita et al. | |
| 8,363,729 B1* | 1/2013 | Sha et al. | 375/240.23 |
| 2003/0012275 A1* | 1/2003 | Boice et al. | 375/240.01 |
| 2003/0184453 A1* | 10/2003 | Hall et al. | 341/51 |
| 2004/0054721 A1* | 3/2004 | Pilu et al. | 709/203 |
| 2005/0146521 A1 | 7/2005 | Kayle et al. | |
| 2005/0160473 A1* | 7/2005 | Gal-Oz | 725/118 |
| 2006/0115092 A1* | 6/2006 | Toyama et al. | 381/23 |
| 2006/0129909 A1* | 6/2006 | Butt et al. | 715/500.1 |
| 2006/0210182 A1* | 9/2006 | Kimura | 382/233 |
| 2007/0230565 A1* | 10/2007 | Tourapis et al. | 375/240.01 |
| 2008/0025391 A1* | 1/2008 | Amon et al. | 375/240.02 |
| 2008/0123754 A1* | 5/2008 | Ratakonda et al. | 375/240.29 |
| 2008/0242946 A1* | 10/2008 | Krachman | 600/300 |
| 2009/0177479 A1 | 7/2009 | Yoon et al. | |
| 2009/0232207 A1* | 9/2009 | Chen | 375/240.12 |
| 2009/0315980 A1 | 12/2009 | Jung et al. | |
| 2010/0023634 A1* | 1/2010 | Labonte et al. | 709/231 |
| 2010/0076577 A1 | 3/2010 | Lee et al. | |
| 2010/0092099 A1* | 4/2010 | Richter | 382/244 |
| 2010/0174541 A1* | 7/2010 | Vos | 704/230 |
| 2010/0195723 A1* | 8/2010 | Ikai et al. | 375/240.12 |
| 2010/0238267 A1 | 9/2010 | Izzat et al. | |
| 2010/0309975 A1* | 12/2010 | Zhou et al. | 375/240.03 |
| 2011/0119708 A1 | 5/2011 | Lee et al. | |
| 2011/0200266 A1* | 8/2011 | Fuchie et al. | 382/251 |
| 2012/0062700 A1* | 3/2012 | Antonellis et al. | 348/43 |

OTHER PUBLICATIONS

"High Quality 3D on Blu-ray is Here . . . ", Technicolor.com., the date of publication is not available. Admitted prior art.

International Search Report & Written Opinion, ISA/US, Jan. 25, 2012.

* cited by examiner

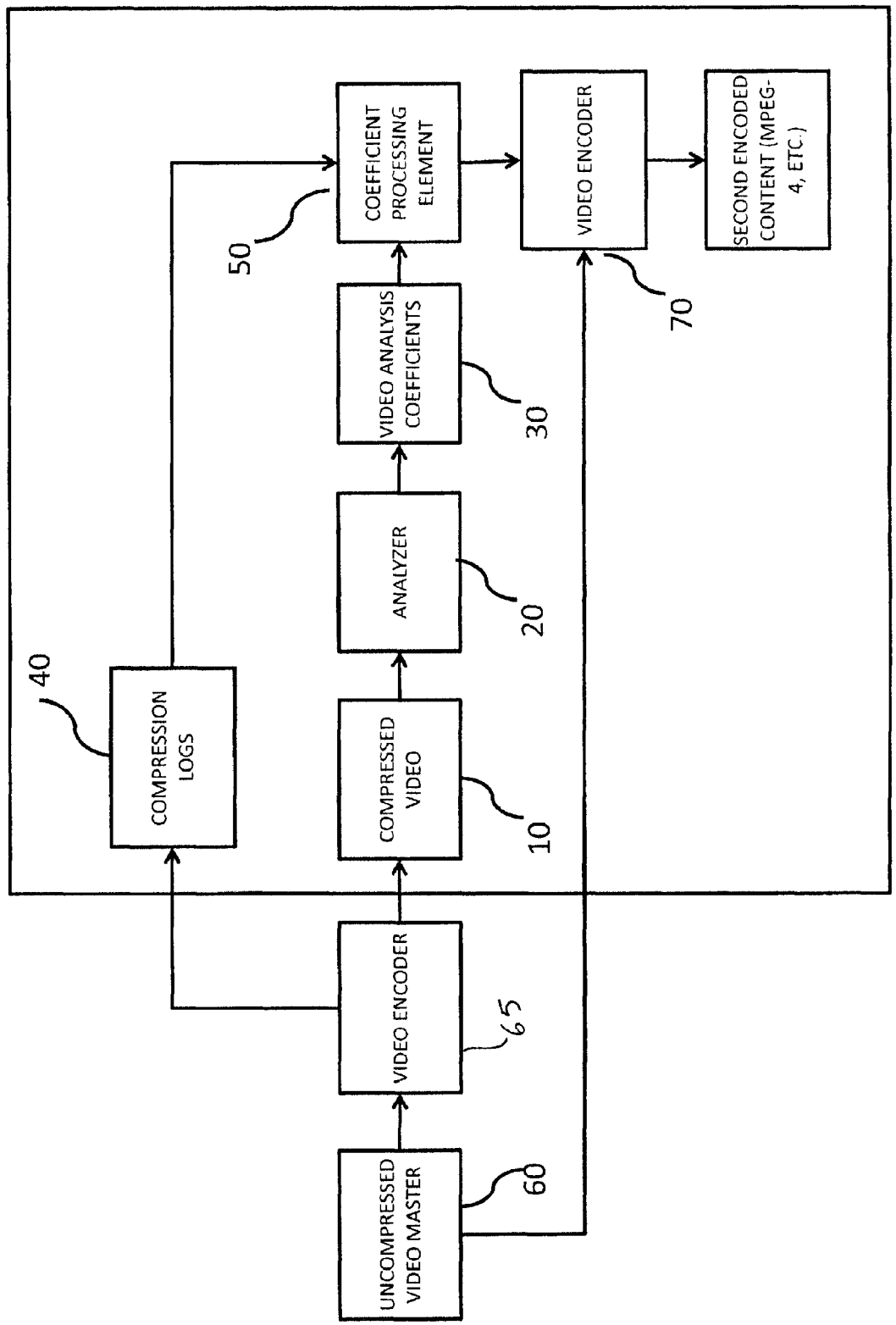

METHOD AND APPARATUS FOR GENERATING ENCODED CONTENT USING DYNAMICALLY OPTIMIZED CONVERSION

RELATED APPLICATIONS

This application claims priority to U.S. provisional application Ser. No. 61/360,088 filed on Jun. 30, 2010 and incorporated herein in its entirety.

BACKGROUND OF THE INVENTION

1. Field of Invention

This invention pertains to a method and apparatus for optimizing a process for encoding content based on a previous process for encoding the same content.

2. Description of the Prior Art

In the past, content, such as movies, were recorded optically on film, and then distributed in analog formats. However, digital cinema has been developed as a result of advances in digital signal processing and projection to the point where movies and similar multimedia presentations are now available in digital format. To generate a digital cinema digitally, movies are either shot directly or post-produced on a digital medium in an uncompressed video format, or are shot on film and are then converted and recorded on a digital medium. Once generated, the digital can be distributed either via hard drives, flash drives, optical discs (such as DVDs), electronically using various digital transmission schemes, etc. In the present application, the term "digital movie" is used to refer to a motion picture or other multi-media presentation recorded or shot on a film, developed and the resulting film was scanned to convert the content into a digital format. Various digital cameras and post platforms are available that can be used to record or post a film in either 2K or 4K format.

Popular format presently in use in the industry include the 2K and the 4K formats. There are several variations for each format, as illustrated by the following list:

| Common designation | Screen Resolution (and aspect ratio |
|---|---|
| 2K | 2048 × 1536 16 mm |
| 2K Academy projection | 2048 × 1107 |
| 2K TI DLP | 2048 × 1080 |
| 4K | 4096 × 3072 35 mm; 1.33 aspect |
| 4K Academy projection | 4096 × 2214 35 mm 1.66/1.85 aspect |
| 4K | 4096 × 6144 35 mm VistaVision |
| 4K Academy Full Frame | 4096 × 2988 35 mm 1.37 aspect |

Some cameras and post tools are available that have even higher resolutions.

The uncompressed video is then compressed and encoded into either a format compatible with digital projectors, e.g., the JPEG 2000 format, or a format compatible with a digital media such as MPEG-2, AVC, VC-1, MVC, etc. The second formats usually use a variable bit rate scheme in which the bit rate for each scene is determined by the authoring software and/or operator on a scene-by-scene basis and recorded in a respective log. The determination of the bit rate is made based on the complexity of the respective scene, dependent for example, on the amount of movement of actors or objects, correlated or uncorrelated motion vectors, edges or planes of activity, or other material changes from one set of frames to another.

One problem with these schemes is that, recently, there is a need to stream a digital movie at a relatively low bit rate over standard distributed networks (e.g., the Internet). However, a digital movie prepared for some distribution scheme (e.g. DVD or BD) in either format is often too large in size and bandwidth requirements, and therefore is not suitable for streaming or other low-bandwidth and/or file size distribution. Therefore, subsequent digital encoding of the content is required, and an efficient scheme to optimize quality is needed.

Moreover, since an encoding process has already taken place, information from this previous process is available that would make the new process, simpler, more reliable and/or more efficient.

SUMMARY OF THE INVENTION

Briefly, the present invention provides a solution for the above-described problem and it operates as follows. Content such as a digital movie recorded in a variable bit rate mode using a format such as MPEG-2, is analyzed for the purpose of compressing using conventional means so that it is suitable for streaming, or other (possibly lower) bitrate/file size distribution, or in another compression scheme.

Even if the resulting file size and/or bitrate were to be relevantly similar to the original file, there may be a need to re-encode using a different compression scheme simply due to distribution constraints, e.g. the requirement of some platforms that one or another compression scheme must be used.

As part of this analysis, various parameters of the digital movie after conversion are determined, including the groups of pictures (GOP) associated with various segments, frames or scenes of the film, bit rate parameters associated with each GOP, (e.g., peak, average, minimum values), I-frames, video buffer size, motion vectors, and so on. The stream analysis and the determination of the parameters can be performed on the fly. These parameters are used either directly or after an appropriate mapping or other type of processing as encoding coefficients when the original content is encoded a second time.

In an alternate embodiment, as the first encoder performs the encoding, parameters associated with the encoding are stored in a parameter log. These parameters are then used (again, either directly, or after processing) as the encoding coefficients for the second encoding process, either using the same or a different encoder.

In one embodiment, the parameters from the compression log and the parameters obtained from analyzing the first encoded content are combined and provided to the second encoder as some of the encoding coefficients.

BRIEF DESCRIPTION OF THE DRAWINGS

FIG. 1 shows a block diagram of an apparatus used for implementing the subject invention.

DETAILED DESCRIPTION OF THE PREFERRED EMBODIMENT OF THE INVENTION

As previously discussed, the present invention provides a method and apparatus in which an initial content (such as an uncompressed digital master) is encoded a first time to obtain a first encoded content. At later time, the same initial content is encoded a second time to obtain a second encoded content having a different format then the first encoded content.

Purely for illustrative purposes, the initial content may be an uncompressed digital master file, for example, a digital movie, which is converted to a first encoded content, for example in an MPEG 2 format. The first compression requires a manual and laborious performed by skilled encoding operators that define the encoder's coefficients so that the highest quality image content is created in the first encoded content. This compression process might requires multiple revision and adjustments of the encoder's coefficients until the highest quality image is reached in each scene of the movie. Either immediately thereafter, or sometimes later, the initial content is converted into a second encoded content in a different format, such as streaming MPEG 4, using either the same or a different encoder. According to this invention, the second encoding is performed using encoding coefficients derived from the first encoding process.

The invention is particularly useful in a scenario where there is a substantial time lapse between the first and second encoding and therefore by the time the second encoding takes place the first encoder is no longer available.

Referring to the FIGURE, content, such as the uncompressed digital video master (of a digital movie) 60 is initially encoded using any standard well known encoder 65. The encoder 10 performs the encoding using a predetermined set of encoding coefficients. Encoders suitable of this kind are well known in the art and are available from several sources such as:

Toshiba (DVD encoder-MPEG2)
Main Concept (MPEG1, MPEG2, MPEG4/H.264, JPEG2000)
Microsoft Windows Media Encoder (Windows Media Video, VC-1)
FFMPEG (supports multiple codecs including, but not limited to, MPEG1, MPEG2, MPEG4/H.264, VP8, RealVideo, Windows Media Video, VC-1, Flash Video
Sonic Solutions CineVision (MPEG2, VC-1, H.264)
Kakadu (JPEG2000)—used for digital cinema encoding and for the Warner Bros. Digital End To End eMaster encoding The video encoder 65 generates a first encoded content, for example in the form of a compressed video 10. In one embodiment of this invention, the first encoded content is then analyzed by analyzer (20) in order to determine one or more parameters, including groups of pictures (GOP) associated with various segments, frames or scenes of the film, bit rate parameters associated with each GOP, (e.g., peak, average, minimum values), I-frames, video buffer size, motion vectors, and so on. The analyzer 30 may be implemented any one of several well known tools like Stream Eye Pro and Stream Analyzer By Elacard, MPEG_DUMP by Roy Wang or Elementary Stream Compliance Check and Analyzer by Tektronix.

The first encoded content can be recorded or used for other purposes.

The initial content also needs to be encoded into a second encoded content either at the same time, or at a later time, in a second format. For example, it may be desirable to compress the uncompressed video master so that it is suitable for streaming, or other lower bitrate/file size distribution, or in another compression scheme. The conventional process has been to take the uncompressed video master and encode it a second time using either the same encoder (reset for an output in a different format, such as MPEG 4) or a second encoder. In either case, a second set of encoding coefficients is used which are normally preselected. Even if the resulting second encoded content has a file size and/or bitrate that is relevantly similar to first encoded file, there may be a need to re-encode using a different encoding scheme simply due to distribution constraints, e.g., the requirement of some platforms that one or another compression scheme must be used. However, repeating the process or using the process while the initial process is ignored is wasteful, slow and generally inefficient. For example, the parameters derived from the analyzer and from the compression logs will be able to define the encoder's coefficients for complex scenes of the movies so that the encoders will allocate more bits and therefore obtain highest quality image.

In accordance with the present invention, the second encoding is performed by encoder 70 using at least some if not all the parameters derived from the first encoding. If the two encoding processes and encoders are very similar, the parameters or video analysis coefficients determined by an analyzer 20 may be used as the encoding coefficients. If the processes, and/or encoders 65, 70 used for the second encoding are different, then in some instances, the parameters obtained from the analyzer 20 may be transformed into a new set of encoding coefficients suitable for the second encoder 70. This transformation is implemented using a coefficient processing element 50.

Typically, when content is encoded by an encoder, the encoder generates an appropriate compression log. These logs contain compiled values for some or all the parameters discussed above. In another embodiment of the invention, the parameters compiled in the compression log 40 while the first encoded content is generated are used to generate encoding coefficients for a second encoding process. In other words, once the first encoded content is generated, the resulting parameters from the compressed log 40 are used as at least some of the encoding coefficients for encoder 70. Alternatively, if necessary the parameters from the compression log 40 are first processed by coefficient processing element to generate coefficients that are compatible and suitable for the second encoding process performed by encoder 70.

In embodiment of the invention, the encoding coefficients for encoder 70 are derived from both the video analysis coefficients 30 and the compression logs 40.

In the previous discussion, the apparatus shown in the FIGURE is described as having two separate encoders 65, 70 performing two different encoding processes. However, instead of two encoders, a single encoder 10 may be used for both processes, using the first (preselected) encoding coefficients for the first process and the second encoding coefficients for the second set. However, at least some of the second encoding coefficients 70A are determined or selected by the device based on the first encoding process, as discussed.

Numerous modifications may be made to the invention without departing from its scope as defined in the appended claims.

We claim:

1. An apparatus for generating encoded content in an output format from an initial content in an initial format, said initial content having been used by an earlier encoder to generate a first encoded content using at least one first encoding coefficient, said first encoded content having a first format compatible with a first content player, said apparatus comprising:

an analyzer receiving said first encoded content and being configured to generate a first parameter based on said first encoded content;

a current encoder receiving said initial content and a second encoding coefficient and encoding said initial content into a second encoded content in accordance with at least said second encoding coefficient, said second encoded content having a second format, said second format being different than said first format; and a coefficient generator including a mapping member, said coefficient generator receiving said first encoding coefficient from a parameter log derived from said initial encoder, said coefficient generator receiving said first parameter and generating said second encoding coefficient by mapping said first parameter with said mapping member.

2. The apparatus of claim 1 wherein said current encoder encodes said initial content twice using different encoding coefficients for each encoding.

3. The apparatus of claim 1 wherein said current encoder encodes said initial content in accordance with a set of coefficients, wherein at least one of said coefficients is derived from said first parameter.

4. A method of generating an output encoded content from an initial content, wherein said initial content has been previously encoded into a first encoded content having a first format using an initial encoding coefficient, said first encoded content in said first format being compatible with a legacy device for presenting said encoded content to a user, said first coefficient being stored in a parameter log derived from the initial encoder, said method comprising the steps of:

analyzing said first encoded content to determine a first parameter;

generating a current encoding coefficient from first parameter and said first encoding coefficient by using a mapping member to map said first parameter; and encoding said initial content using a current encoder to obtain a second encoded content, said current encoder performing said encoding using said second coefficient, said second encoded content having a different format than said first encoded content, said second encoded content being incompatible with a player compatible with said first encoded content.

5. The method of claim 4 wherein said first parameter is one of groups of pictures (GOP) associated with various segments, frames or scenes, bit rate parameters associated with each GOP, (e.g., peak, average, minimum values), I-frames, video buffer size and a motion vector.

6. The method of claim 4 wherein said current encoder performs said encoding using at least a preset encoding coefficient and said second encoding coefficient.

7. The method of claim 4 wherein said current encoder performs said encoding using a set of coefficients including a first subset of coefficients and a second subset of coefficients, and wherein said first subset of coefficients are preset and said second set of coefficients are derived from said first parameter.

8. The method of claim 4 wherein said current encoder performs said second encoding using a set of coefficients, further comprising mapping said parameters to derive said set of coefficients.

9. The method of claim 4 wherein said second encoded content has a format suitable for video streaming over the internet.

10. The method of claim 4 wherein said initial encoded content has a high definition format suitable for high definition presentations.

11. A method of generating an output encoded content from an initial content, wherein said initial content has been previously encoded using a first coefficient in a parameter log into a first encoded content having a first format playable on a first player, said method comprising the steps of:

analyzing said first encoded content to determine a first parameter;

generating a current encoding coefficient by using a mapping member to map said first parameter into current encoding coefficient; and encoding said initial content using a current encoder to obtain a second encoded content as said output encoded content, said current encoder performing said encoding using said current encoding coefficient to generate said output encoded content in a second format compatible with a second player, said second format being incompatible with said first player.

* * * * *